(12) United States Patent
Kitahara et al.

(10) Patent No.: US 12,265,220 B2
(45) Date of Patent: Apr. 1, 2025

(54) IMAGE DISPLAY DEVICE

(71) Applicant: NICHIA CORPORATION, Anan (JP)

(72) Inventors: Wataru Kitahara, Kamiina-gun (JP); Takanori Aruga, Suwa-gun (JP); Hajime Akimoto, Anan (JP)

(73) Assignee: NICHIA CORPORATION, Anan (JP)

( * ) Notice: Subject to any disclaimer, the term of this patent is extended or adjusted under 35 U.S.C. 154(b) by 0 days.

(21) Appl. No.: 18/496,594

(22) Filed: Oct. 27, 2023

(65) Prior Publication Data

US 2024/0160014 A1 May 16, 2024

(30) Foreign Application Priority Data

Nov. 15, 2022 (JP) ................. 2022-182313

(51) Int. Cl.
*G02B 27/01* (2006.01)
*G02F 1/1335* (2006.01)

(52) U.S. Cl.
CPC ... *G02B 27/0101* (2013.01); *G02F 1/133536* (2013.01); *G02F 1/133553* (2013.01)

(58) Field of Classification Search
None
See application file for complete search history.

(56) References Cited

U.S. PATENT DOCUMENTS

| | | | |
|---|---|---|---|
| 5,764,407 A | 6/1998 | Nanba | |
| 10,606,075 B2 * | 3/2020 | Choi | G02B 27/0179 |
| 11,169,377 B1 * | 11/2021 | Chen | G02B 27/0101 |
| 11,287,649 B2 | 3/2022 | Hong | |
| 2003/0035232 A1 | 2/2003 | Sasaki | |
| 2003/0107716 A1 | 6/2003 | Ogawa | |
| 2004/0145814 A1 | 7/2004 | Rogers | |
| 2005/0007593 A1 * | 1/2005 | Lebens | G01N 21/8806 356/394 |
| 2005/0052617 A1 | 3/2005 | Fujikawa et al. | |

(Continued)

FOREIGN PATENT DOCUMENTS

| | | |
|---|---|---|
| JP | H03-273943 A | 12/1991 |
| JP | H06-347708 A | 12/1994 |

(Continued)

OTHER PUBLICATIONS

U.S. Appl. No. 18/390,954, filed Dec. 20, 2023, Kitahara et al.

(Continued)

*Primary Examiner* — Ryan Crockett
(74) *Attorney, Agent, or Firm* — Foley & Lardner LLP

(57) ABSTRACT

An image display device includes: a display device configured to display an image; a liquid crystal element on which light emitted from the display device is incident, the liquid crystal element being configured to selectively allow one of P-polarized light or S-polarized light to exit the liquid crystal element; a reflective polarizing member configured to reflect the one of the P-polarized light or the S-polarized light that has exited the liquid crystal element and to transmit the other of the P-polarized light or the S-polarized light; and a reflecting member configured to reflect the other of the P-polarized light or the S-polarized light in the same direction as a travel direction of the one of the P-polarized light or the S-polarized light reflected by the reflective polarizing member.

20 Claims, 12 Drawing Sheets

(56) References Cited

U.S. PATENT DOCUMENTS

| | | |
|---|---|---|
| 2007/0146242 A1 | 6/2007 | Miller et al. |
| 2008/0316606 A1 | 12/2008 | Inoguchi et al. |
| 2009/0040588 A1 | 2/2009 | Tonar et al. |
| 2010/0109977 A1 | 5/2010 | Yamazaki et al. |
| 2010/0271396 A1* | 10/2010 | Nemeth ............... G09G 5/14 345/641 |
| 2011/0164311 A1 | 7/2011 | Morikuni |
| 2015/0253469 A1 | 9/2015 | Le Gros et al. |
| 2015/0378104 A1 | 12/2015 | Takahashi |
| 2017/0146803 A1* | 5/2017 | Kishigami ........... G02B 5/3083 |
| 2018/0024335 A1 | 1/2018 | Uehara |
| 2018/0039077 A1 | 2/2018 | Kuzuhara et al. |
| 2018/0352204 A1 | 12/2018 | Fujita |
| 2018/0358339 A1 | 12/2018 | Iguchi |
| 2019/0011712 A1 | 1/2019 | Nagano et al. |
| 2019/0049725 A1 | 2/2019 | Kondo et al. |
| 2019/0061525 A1 | 2/2019 | Ji |
| 2019/0061638 A1 | 2/2019 | Hisatsugu et al. |
| 2019/0071014 A1 | 3/2019 | Misu |
| 2019/0072764 A1 | 3/2019 | Lee et al. |
| 2019/0072799 A1 | 3/2019 | Narushima |
| 2019/0073828 A1 | 3/2019 | Oiwa |
| 2020/0201036 A1* | 6/2020 | Hong ................... G02F 1/1334 |
| 2020/0271927 A1 | 8/2020 | Kawana |
| 2020/0319456 A1 | 10/2020 | Yatsu et al. |
| 2020/0333608 A1 | 10/2020 | Katagiri et al. |
| 2021/0239989 A1 | 8/2021 | Ide et al. |
| 2021/0325700 A1 | 10/2021 | Chen |
| 2021/0373331 A1* | 12/2021 | Gu ....................... G02F 1/0136 |
| 2021/0382304 A1* | 12/2021 | You .................... G02B 27/0093 |
| 2022/0035165 A1 | 2/2022 | Takeda et al. |
| 2022/0138916 A1 | 5/2022 | Takagi et al. |
| 2022/0350139 A1 | 11/2022 | Tsuda et al. |
| 2022/0365266 A1* | 11/2022 | Cheng ............... G02B 27/0172 |
| 2022/0365345 A1* | 11/2022 | Hamada ................ B60K 35/00 |
| 2023/0026137 A1 | 1/2023 | Kusafuka et al. |
| 2023/0034288 A1 | 2/2023 | Hong et al. |
| 2023/0118416 A1 | 4/2023 | Hirata et al. |
| 2023/0415576 A1* | 12/2023 | Zozgornik ........... G02B 5/0816 |
| 2024/0061240 A1* | 2/2024 | Hirata ................... G02B 30/56 |
| 2024/0210684 A1 | 6/2024 | Kitahara et al. |

FOREIGN PATENT DOCUMENTS

| | | |
|---|---|---|
| JP | H07-140918 A | 6/1995 |
| JP | H07-306377 A | 11/1995 |
| JP | H09-200651 A | 7/1997 |
| JP | H10-274740 A | 10/1998 |
| JP | 2003-005073 A | 1/2003 |
| JP | 2003-043360 A | 2/2003 |
| JP | 2003-177320 A | 6/2003 |
| JP | 2004-045718 A | 2/2004 |
| JP | 2004-527801 A | 9/2004 |
| JP | 2005-070255 A | 3/2005 |
| JP | 2009-003128 A | 1/2009 |
| JP | 2009-251194 A | 10/2009 |
| JP | 2010-107873 A | 5/2010 |
| JP | 2011-138086 A | 7/2011 |
| JP | 2013-183042 A | 9/2013 |
| JP | 2016-033867 A | 3/2016 |
| JP | 2016-102810 A | 6/2016 |
| JP | 2016-148829 A | 8/2016 |
| JP | 2017-037304 A | 2/2017 |
| JP | 2017-049371 A | 3/2017 |
| JP | 2019-073272 A | 5/2019 |
| JP | 2019-095690 A | 6/2019 |
| JP | 2020-012986 A | 1/2020 |
| JP | 2020-074005 A | 5/2020 |
| JP | 2020-144184 A | 9/2020 |
| JP | 6809441 B2 | 1/2021 |
| JP | 2021-124527 A | 8/2021 |
| JP | 2021-162801 A | 10/2021 |
| JP | 2021-529332 A | 10/2021 |
| JP | 2022-025889 A | 2/2022 |
| JP | 2022-073094 A | 5/2022 |
| JP | 2022-129223 A | 9/2022 |
| WO | WO-2015/190157 A1 | 12/2015 |
| WO | WO-2016/103418 A1 | 6/2016 |
| WO | WO-2016/208195 A1 | 12/2016 |
| WO | WO-2017/138242 A1 | 8/2017 |
| WO | WO-2017/154360 A1 | 9/2017 |
| WO | WO-2017/170702 A1 | 10/2017 |
| WO | WO-2019/008684 A1 | 1/2019 |
| WO | WO-2019/130860 A1 | 7/2019 |
| WO | WO-2019/130944 A1 | 7/2019 |
| WO | WO-2021/054277 A1 | 3/2021 |
| WO | WO-2021/065820 A1 | 4/2021 |
| WO | WO-2021/106689 A1 | 6/2021 |

OTHER PUBLICATIONS

U.S. Appl. No. 18/511,505, filed Nov. 16, 2023, Kitahara et al.
U.S. Appl. No. 18/513,895, filed Nov. 20, 2023, Kitahara et al.
U.S. Appl. No. 18/538,112, filed Dec. 13, 2023, Aruga et al.
U.S. Appl. No. 18/543,762, filed Dec. 18, 2023, Kitahara et al.
Non-Final Office Action in U.S. Appl. No. 18/538,112 dated Nov. 5, 2024.
Notice of Allowance in U.S. Appl. No. 18/513,895 Dtd Aug. 6, 2024.

* cited by examiner

IMAGE DISPLAY DEVICE

CROSS-REFERENCE TO RELATED APPLICATIONS

This application is based upon and claims the benefit of priority from the prior Japanese Patent Application No. 2022-182313, filed on Nov. 15, 2022, the entire contents of which are incorporated herein by reference.

BACKGROUND

The present disclosure relates to an image display device.

PCT Publication No. WO2016/208195 discloses a technology in which light emitted from a display device is sequentially reflected by multiple mirrors, and the light reflected by the final mirror is further reflected toward a user by a reflecting member such as a windshield or the like, thereby causing a user to see a virtual image corresponding to the image displayed by the display device. In recent years, there has been a demand for the display of three-dimensional virtual images.

SUMMARY

An object of certain embodiments of the present invention is to provide an image display device configured to display virtual images having different focal lengths.

An image display device according to one embodiment of the invention includes a display device configured to display an image; a liquid crystal element on which light emitted from the display device is to be incident, the liquid crystal element being configured to selectively allow one of P-polarized light or S-polarized light to exit the liquid crystal element; a reflective polarizing member configured to reflect the one of the P-polarized light or the S-polarized light exited the liquid crystal element and to transmit the other of the P-polarized light or the S-polarized light; and a reflecting member configured to reflect the other of the P-polarized light or the S-polarized light into a direction same as a travel direction of the one of the P-polarized light or the S-polarized light reflected by the reflective polarizing member.

An image display device according to one embodiment of the invention includes a display device configured to display an image; a liquid crystal element on which light emitted from the display device is to be incident, the liquid crystal element being configured to selectively allow one of P-polarized light or S-polarized light to exit the liquid crystal element; and a light-transmitting member on which light emitted from the liquid crystal element is to be incident, the light-transmitting member including: a first surface configured to reflect one of the P-polarized light or the S-polarized light emitted from the liquid crystal element and to allow the other of the P-polarized light or the S-polarized light to enter the light-transmitting member; and a second surface configured to reflect the other of the P-polarized light or the S-polarized light into a direction same as a travel direction of the one light reflected by the first surface.

According to certain embodiments of the invention, an image display device can be provided in which virtual images having different focal lengths can be displayed.

DETAILED DESCRIPTION

Figure 1:
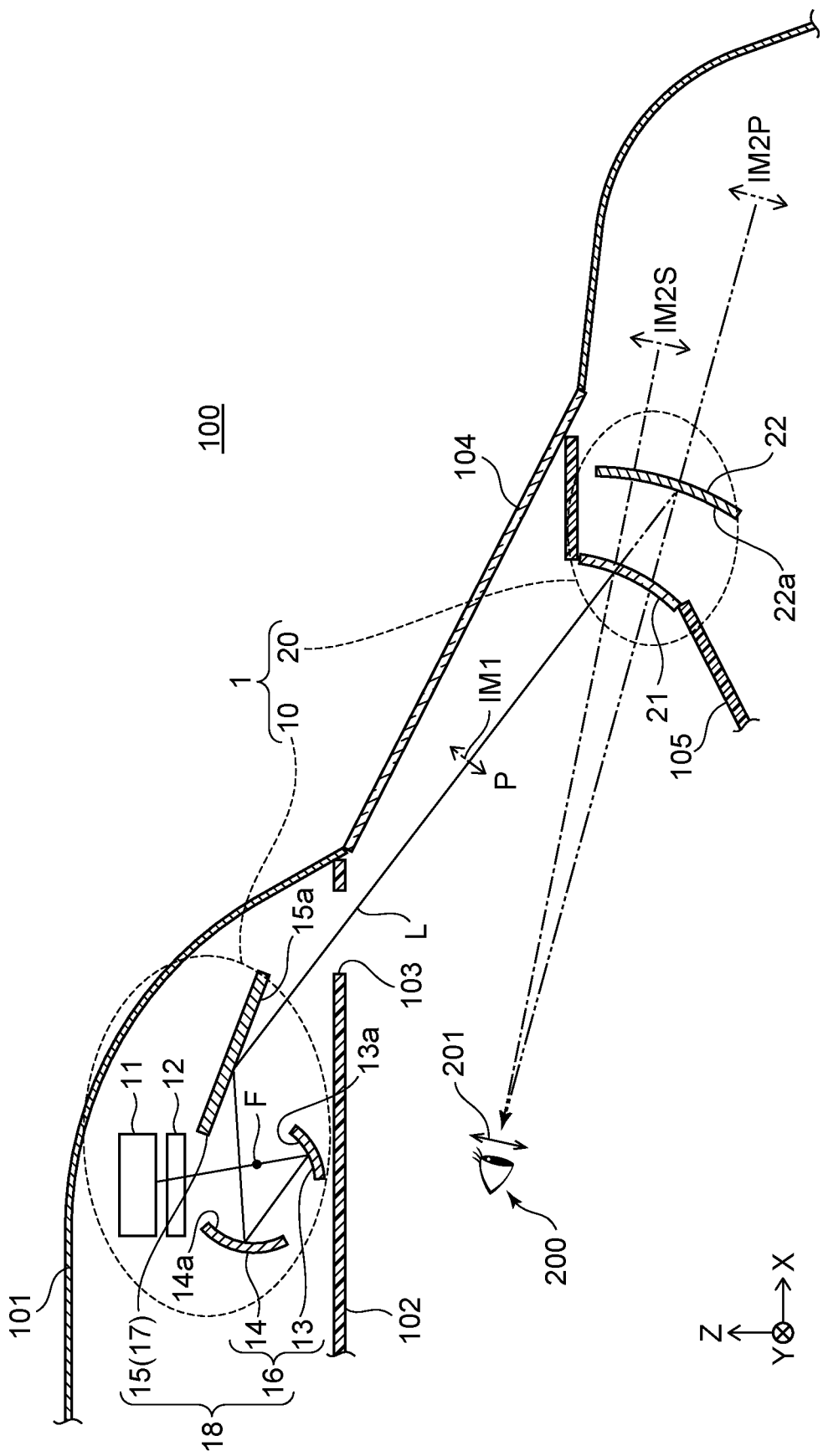
FIG. 1 is an end view showing an image display device according to a first embodiment.

Exemplary embodiments will now be described with reference to the drawings. The drawings are schematic or conceptual, and the relationships between the thickness and width of portions, the proportional coefficients of sizes among portions, etc., are not necessarily the same as the actual values thereof. Furthermore, the dimensions and proportional coefficients may be illustrated differently among drawings, even for identical portions. In the specification of the application and the drawings, components similar to those described in regard to a previous drawing are marked with like reference numerals, and a detailed description is omitted as appropriate.

First Embodiment

Overall Configuration and Operation

FIG. 1 is an end view showing an image display device according to the present embodiment.

Figure 2:
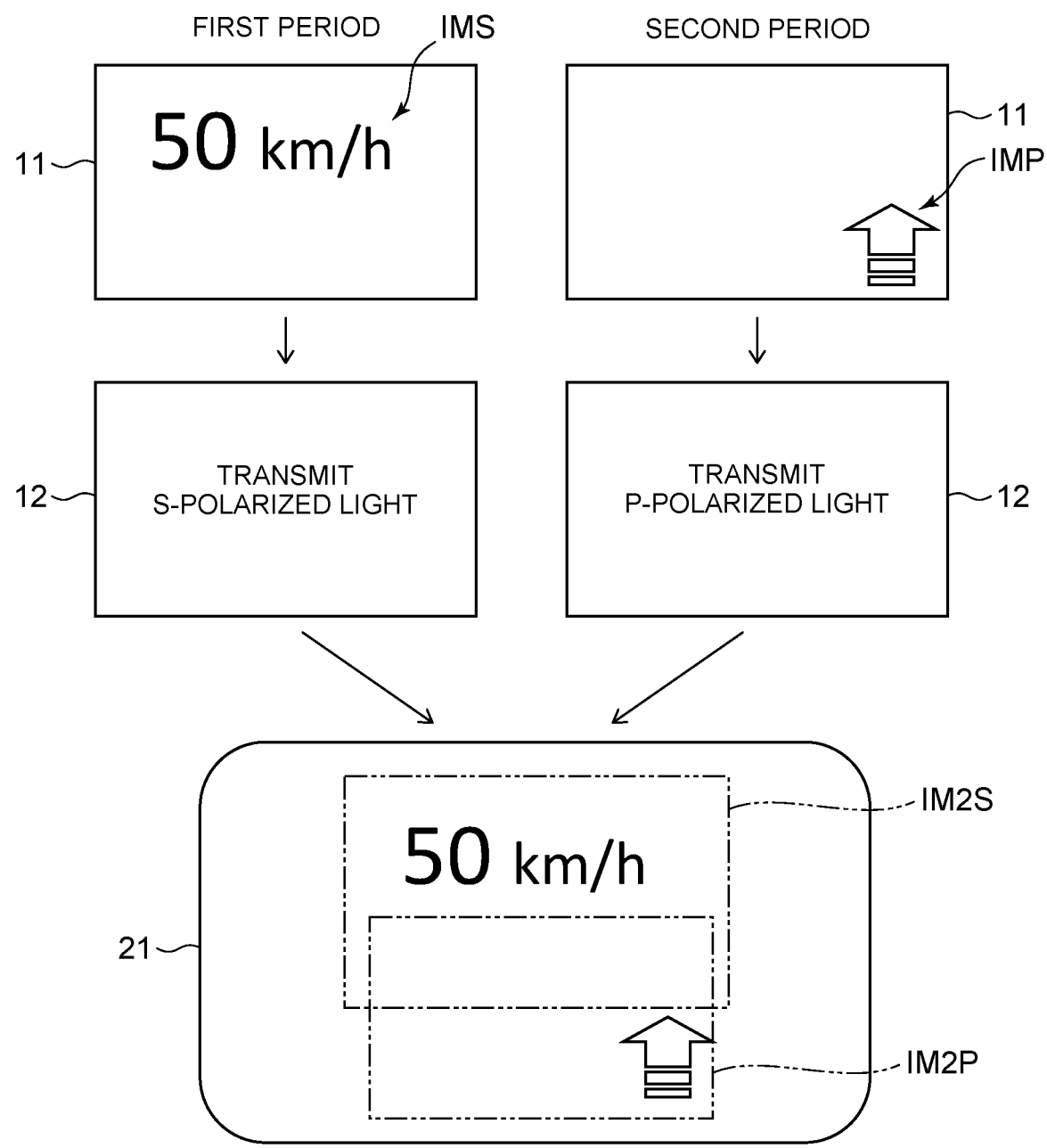
FIG. 2 shows a relationship of images displayed by a display device, states of a liquid crystal element, and virtual images formed by a reflective polarizing member in the image display device according to the first embodiment.

FIG. 2 shows a relationship of images displayed by a display device, states of a liquid crystal element, and virtual images formed by a reflective polarizing member in the image display device according to the present embodiment.

In FIG. 1, the optical path of light L is illustrated by a solid line at portions through which both S-polarized light and P-polarized light can pass, by a single dot-dash line at portions through which only the S-polarized light can pass and for the direction in which the virtual image formed by the S-polarized light is viewed, and by a double dot-dash line at portions through which only the P-polarized light can pass and for the direction in which the virtual image formed by the P-polarized light is viewed. This is similar in FIGS. 9 and 10 below.

As shown in FIG. 1, an automobile 100 includes a vehicle 101, and an image display device 1 mounted in the vehicle 101. A viewer 200 is a passenger of the automobile 100 and is, for example, the driver. An eyebox 201 of the viewer 200 refers to an area in which a virtual image to be described below is visible in the space in front of the eyes of the viewer 200.

The image display device 1 includes a light source unit 10 and a reflection unit 20. The reflection unit 20 is separated from the light source unit 10 and reflects the light emitted from the light source unit 10. For example, the light source unit 10 is located above a ceiling board 102 of a passenger compartment of the vehicle 101. The light that is emitted from the light source unit 10 is incident on the reflection unit 20 via a hole 103 of the ceiling board 102. The reflection unit 20 is located in a part below a front windshield 104 of the vehicle 101 at, for example, a dashboard 105 vicinity and is exposed inside the passenger compartment. The light that is emitted from the light source unit 10 forms a first image IM1 at a position P between the light source unit 10 and the reflection unit 20. The first image IM1 is a real image and is an intermediate image. The conditions at which the first image IM1 is formed will be described below.

The light source unit 10 includes a display device 11, a liquid crystal element 12, an input element 13, an intermediate element 14, and an output element 15. The display device 11 is configured to display an image IMP and an image IMS (hereinbelow, also generally referred to as the "image IM"). The display device 11 is, for example, an LED display that includes multiple LED (Light-Emitting Diode) elements. The light that is emitted from the display device 11 is incident on the liquid crystal element 12, and the liquid crystal element 12 is configured to selectively allow one of P-polarized light or S-polarized light to exit the liquid crystal element 12. The light that exits the liquid crystal element 12 is incident on the input element 13, and the input element 13 reflects the incident light. The light that exits the input element 13 is incident on the intermediate element 14, and the intermediate element 14 reflects the incident light. The light that exits the intermediate element 14 is incident on the output element 15, and the output element 15 reflects the incident light. The light that is reflected at the output element 15 is emitted from the light source unit 10 toward the reflection unit 20.

The reflection unit 20 includes a reflective polarizing member 21 and a reflecting member 22. The reflective polarizing member 21 reflects one light of the P-polarized light or the S-polarized light emitted from the liquid crystal element 12 and transmits the other light of the P-polarized light or the S-polarized light. In the example shown in FIG. 1, the reflective polarizing member 21 reflects the S-polarized light and transmits the P-polarized light. However, the reflective polarizing member 21 may reflect the P-polarized light and transmit the S-polarized light.

The other light (e.g., the P-polarized light) transmitted by the reflective polarizing member 21 is reflected by the reflecting member 22 in a direction same as the travel direction of the one light (e.g., the S-polarized light) reflected by the reflective polarizing member 21. The term "same direction" as used herein encompasses not only a case in which the one light and the other light described above travels an exactly same direction, but sufficiently encompasses a case in which both the one light and the other light enter the eyebox 201 of the viewer 200.

When the reflective polarizing member 21 reflects the S-polarized light and transmits the P-polarized light, and when the S-polarized light is emitted from the liquid crystal element 12 as shown by the single dot-dash line in FIG. 1, the S-polarized light is reflected by the reflective polarizing member 21 and enters the eyebox 201 of the viewer 200. Accordingly, the viewer 200 recognizes a virtual image IM2S, corresponding to the image IM, beyond the reflective polarizing member 21. When viewed from the viewer 200, the distance between the reflective polarizing member 21 and the virtual image IM2S is equal to the distance between the reflective polarizing member 21 and the position P at which the first image IM1 is formed.

When the reflective polarizing member 21 reflects the S-polarized light and transmits the P-polarized light and the P-polarized light is emitted from the liquid crystal element 12 as shown by the double dot-dash line in FIG. 1, the P-polarized light is transmitted by the reflective polarizing member 21, reflected by the reflecting member 22, and re-transmitted by the reflective polarizing member 21 to enter the eyebox 201 of the viewer 200. Accordingly, the viewer 200 recognizes a virtual image IM2P, corresponding to the image IM, beyond the reflective polarizing member 21. When viewed from the viewer 200, the distance between the reflective polarizing member 21 and the virtual image IM2P is equal to the total of the distance between the reflecting member 22 and the position P at which the first image IM1 is formed and the distance between the reflecting member 22 and the reflective polarizing member 21.

Accordingly, when viewed from the viewer 200, the virtual image IM2S and the virtual image IM2P are both displayed behind the reflective polarizing member 21. The viewer 200 recognizes the virtual image IM2P as being more distant than the virtual image IM2S. Also, causing the display device 11 and the liquid crystal element 12 to operate together allows the virtual image IM2S and the virtual image IM2P to be mutually-different images. As a result, the image display device 1 can display a three-dimensional virtual image.

In a first period, the image IMS for the S-polarized light is displayed by the display device 11. Also, the liquid crystal element 12 transmits the S-polarized light. Accordingly, the viewer can view the virtual image IM2S corresponding to the image IMS. For example, information that indicates the state of the automobile 100 may be displayed in the virtual image IM2S. FIG. 2 shows an example of displaying the speed of the automobile 100.

In a second period, the display device 11 displays the image IMP for the P-polarized light. Also, the liquid crystal element 12 transmits the P-polarized light. Accordingly, the viewer can view the virtual image IM2P. For example, information of the surroundings of the automobile 100 and/or navigation information may be displayed in the virtual image IM2P. FIG. 2 shows an example in which the existence of another automobile trying to overtake the automobile 100 from the right side is indicated.

Then, by repeating the first period of displaying the virtual image IM2S and the second period of displaying the virtual image IM2P at a sufficiently high frequency, e.g., a frequency that is not less than 30 fps, the viewer 200 can simultaneously recognize the virtual image IM2S and the virtual image IM2P. At this time, the virtual image IM2P appears to be more distant than the virtual image IM2S.

Configurations of components of the image display device 1 will now be described in detail.

An XYZ orthogonal coordinate system is employed hereinbelow for easier understanding of the description. In the present embodiment, the longitudinal direction of the vehicle 101 is taken as an "X-direction," the lateral direction of the vehicle 101 is taken as a "Y-direction," and the vertical direction of the vehicle 101 is taken as a "Z-direction." The XY plane is the horizontal plane of the vehicle 101. The direction of the arrow in the X-direction (front) also is called the "+X direction," and the opposite direction (back) also is called the "−X direction." The direction of the arrow in the Y-direction (left) also is called the "+Y direction," and the opposite direction (right) also is called the "−Y direction." The direction of the arrow in the Z-direction (up) also is called the "+Z direction," and the opposite direction (down) also is called the "−Z direction."

Display Device

Figure 3:
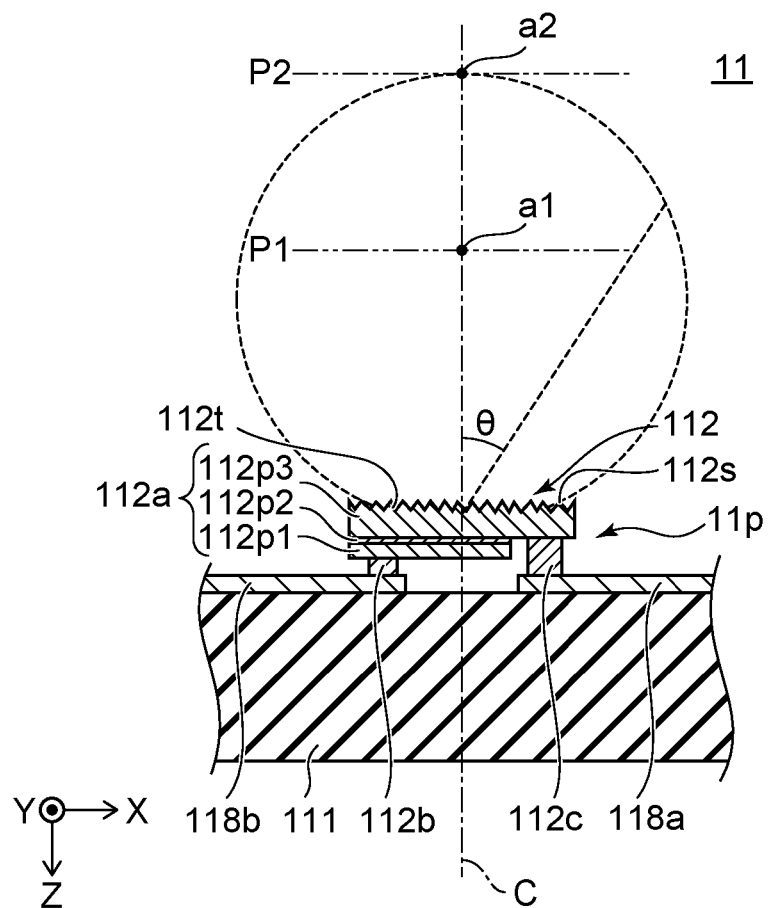
FIG. 3 is an end view showing the display device of the image display device according to the first embodiment.

FIG. 3 is an end view showing the display device of the image display device according to the present embodiment.

As shown in FIG. 1, the display device 11 emits light roughly in the −Z direction. The light forms the image IM.

In the display device 11, a plurality of LED elements 112 such as that shown in FIG. 3 are arranged in a matrix configuration. One or more LED elements 112 correspond to each pixel 11*p* of the display device 11.

In the display device 11, each LED element 112 is mounted face-down on a substrate 111. However, each LED element may be mounted in a face-up manner on the substrate. Each LED element 112 includes a semiconductor stacked body 112*a*, an anode electrode 112*b*, and a cathode electrode 112*c*.

The semiconductor stacked body 112*a* includes a p-type semiconductor layer 112*p*1, an active layer 112*p*2 located on the p-type semiconductor layer 112*p*1, and an n-type semiconductor layer 112*p*3 located on the active layer 112*p*2. The semiconductor stacked body 112*a* includes, for example, a gallium nitride compound semiconductor of $In_XAl_YGa_{1-X-Y}N$ ($0 \leq X$, $0 \leq Y$, and $X+Y<1$). In the present embodiment, the LED element 112 is configured to emit visible light.

The anode electrode 112*b* is electrically connected to the p-type semiconductor layer 112*p*1. Also, the anode electrode 112*b* is electrically connected to a wiring part 118*b*. The cathode electrode 112*c* is electrically connected to the n-type semiconductor layer 112*p*3. Also, the cathode electrode 112*c* is electrically connected to another wiring part 118*a*. For the electrodes 112*b* and 112*c*, for example, a metal material can be used.

In the present embodiment, a plurality of recesses 112*t* are formed in a light-emitting surface 112*s* of each LED element 112. In the present specification, the term "light-emitting surface of the LED element" means a surface of the LED element from which light to be incident on an imaging optical system 18 is emitted. In the present embodiment, a surface of the n-type semiconductor layer 112*p*3 that is positioned at a side opposite to a surface thereof facing the active layer 112*p*2 corresponds to the light-emitting surface 112*s*.

Hereinbelow, an optical axis of light emitted from each LED element 112 is called simply an "optical axis C." The optical axis C is, for example, a straight line that connects a point a1 in a first plane P1, which is a plane positioned at the light-emitting side of the display device 11 and parallel to an emission plane in which the plurality of pixels 11*p* are arranged, and a point a2 in a second plane P2, which is a plane parallel to the emission plane and separated from the first plane P1. The point a1 is a point at which the luminance is greatest in a region irradiated with light from a single pixel 11*p*, and the point a2 is a point at which the luminance is greatest in a region irradiated with light from the LED element 112. For example, if the luminance is greatest at a plurality of points, the center of the points may be used as the point at which the luminance is greatest. From the perspective of productivity, it is desirable for the optical axis C to be orthogonal to the emission plane.

With the plurality of recesses 112*t* in the light-emitting surface 112*s* of each LED element 112, the light that is emitted from each LED element 112, i.e., the light that is emitted from each pixel 11*p*, has a substantially Lambertian light distribution as shown by the broken line in FIG. 3. Herein, the expression "light emitted from each pixel has a substantially Lambertian light distribution" means that the luminous intensity in the direction of an angle θ with respect to the optical axis C of each pixel has a light distribution pattern that can be approximated by $\cos^n \theta$ times the luminous intensity at the optical axis C, wherein n is a value greater than 0. It is favorable for n to be not more than 11, and more favorably 1. Although there are many planes in which the optical axis C of the light emitted from one pixel 11*p* extends, the light distribution pattern of the light emitted from the pixel 11*p* has a substantially Lambertian light distribution in each plane, and the numerical values of n are substantially equal.

However, the configuration of each LED element is not limited to that described above. For example, multiple protrusions instead of multiple recesses may be provided in the light-emitting surface of each LED element, or both multiple recesses and multiple protrusions may be provided. When the growth substrate is light-transmissive, instead of removing the growth substrate from the semiconductor stacked body, a plurality of recesses and/or protrusions may be formed in the surface of the growth substrate corresponding to the light-emitting surface. In such configurations as well, the light that is emitted from each LED element has a substantially Lambertian light distribution. Also, in each LED element, an n-type semiconductor layer may be disposed to face the substrate; an active layer and a p-type semiconductor layer may be stacked in this order on the n-type semiconductor layer, and the surface of the p-type semiconductor layer at the side opposite to the surface facing the active layer may be used as the light-emitting surface of the LED element. As described in other embodiments to be described below, it is sufficient that the light finally emitted from each pixel has a substantially Lambertian light distribution; it is not necessary that light emitted from each LED element has a substantially Lambertian light distribution.

Liquid Crystal Element

Figure 4A:
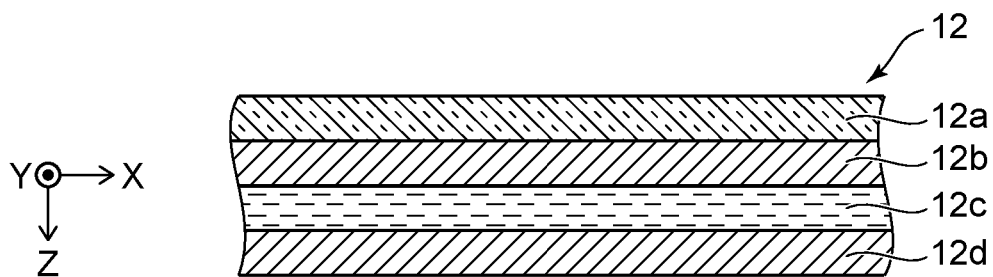
FIG. 4A is an end view showing the liquid crystal element of the image display device according to the first embodiment.

FIG. 4A is an end view showing the liquid crystal element of the image display device according to the present embodiment.

Figure 4B:
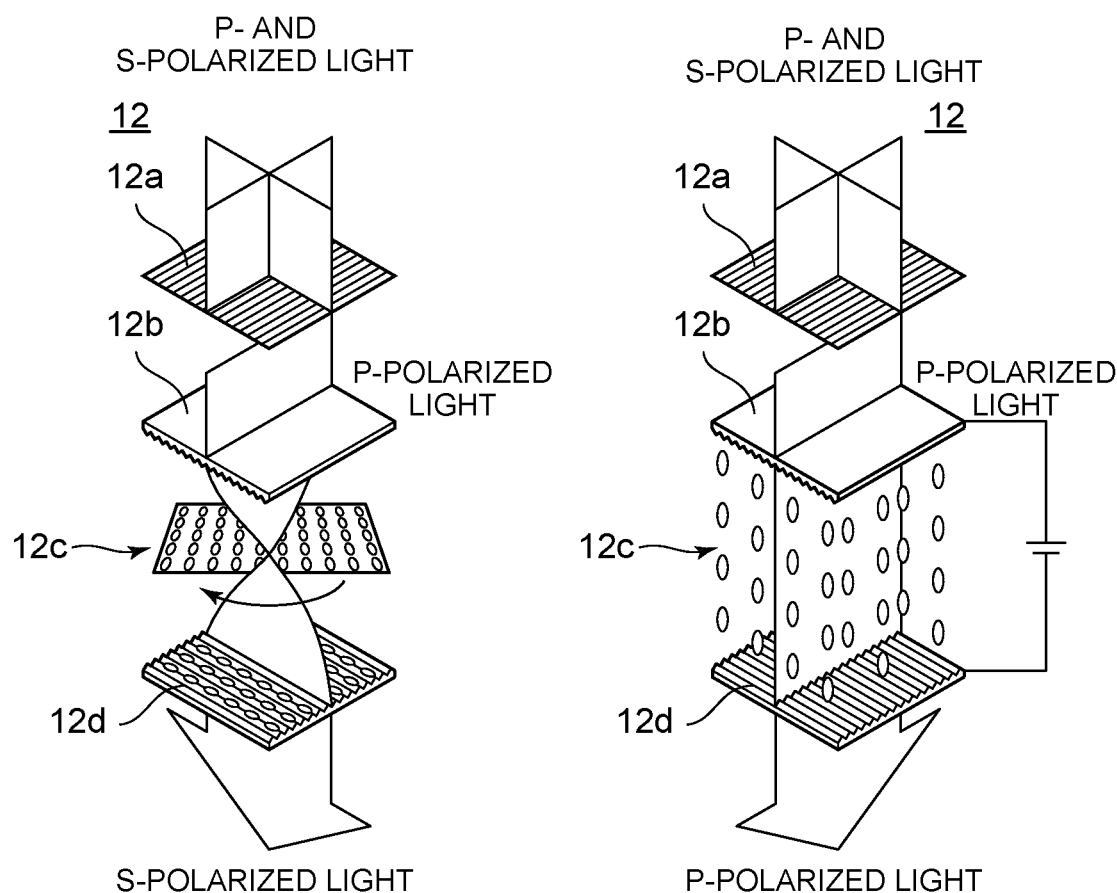
FIG. 4B shows operations of the liquid crystal element of the image display device according to the first embodiment.

FIG. 4B shows operations of the liquid crystal element of the image display device according to the present embodiment.

As shown in FIG. 1, the liquid crystal element 12 is located at the −Z direction side of the display device 11.

As shown in FIGS. 4A and 4B, the liquid crystal element 12 includes a polarizing plate 12*a*, a transparent electrode plate 12*b*, a liquid crystal layer 12*c*, and a transparent electrode plate 12*d*. The polarizing plate 12*a*, the transparent electrode plate 12*b*, the liquid crystal layer 12*c*, and the transparent electrode plate 12*d* are stacked in this order along the path of the light emitted from the display device 11.

The polarizing plate 12*a* shields a portion of the S-polarized light or a portion of the P-polarized light and transmits the remainder of the light emitted from the display device 11. In the example shown in FIG. 4B, the polarizing plate 12a shields a portion of the S-polarized light and transmits the greater part of the P-polarized light. When a voltage is not applied between the transparent electrode plate 12b and the transparent electrode plate 12d, the liquid crystal layer 12c converts the polarization direction of the incident light. In the example shown in FIG. 4B, the P-polarized light is converted into S-polarized light. Accordingly, the S-polarized light exits the liquid crystal element 12. On the other hand, when a predetermined voltage is applied between the transparent electrode plate 12b and the transparent electrode plate 12d, the liquid crystal layer 12c transmits the incident light. Accordingly, P-polarized light exits the liquid crystal element 12.

Input Element, Intermediate Element, and Output Element

As shown in FIG. 1, the input element 13 is positioned at the −Z direction side of the liquid crystal element 12 and is disposed to face the liquid crystal element 12. The input element 13 is a mirror having a concave mirror surface 13a. The input element 13 reflects the light emitted from the liquid crystal element 12.

The intermediate element 14 is positioned at the −X/+Z direction side of the input element 13 and is disposed to face the input element 13. The intermediate element 14 is a mirror that includes a concave mirror surface 14a. The intermediate element 14 further reflects the light reflected by the input element 13.

The input element 13 and the intermediate element 14 form a bending part 16 that bends a plurality chief rays L emitted from mutually-different positions of the display device 11 into substantially parallel rays. According to the present embodiment, the mirror surfaces 13a and 14a are biconic surfaces. However, the mirror surfaces 13a and 14a may be portions of spherical surfaces or may be freeform surfaces.

The output element 15 is positioned at the +X direction side of the display device 11, the liquid crystal element 12, the input element 13, and the intermediate element 14, and is disposed to face the intermediate element 14. The output element 15 is a mirror that has a flat mirror surface 15a. The output element 15 reflects, toward the formation position P of the first image IM1, the light traveling via the input element 13 and the intermediate element 14. Specifically, the plurality of chief rays L that are caused to be substantially parallel by the bending part 16 are incident on the output element 15. The mirror surface 15a is oblique to the horizontal plane of the vehicle 101, i.e., the XY plane, to be oriented in the −Z direction along the +X direction. Accordingly, the output element 15 reflects the light reflected by the intermediate element 14 in a direction oblique to the Z-direction to be oriented in the −Z direction along the +X direction. Thus, the output element 15 is included in a direction modifying part 17 that modifies the directions of the plurality of chief rays L so that the plurality of chief rays L caused to be substantially parallel by the bending part 16 are oriented toward the formation position P of the first image IM1.

Each of the input element 13, the intermediate element 14, and the output element 15 may be formed of a main member made of glass, a resin material, or the like and a reflective film that forms the mirror surface 13a, 14a, or 15a located at a surface of the main member and is made of a metal film, a dielectric multilayer film, or the like. The input element 13, the intermediate element 14, and the output element 15 each may be entirely made of a metal material.

The imaging optical system 18 includes the input element 13, the intermediate element 14, and the output element 15. The light that is emitted from the liquid crystal element 12 is incident on the imaging optical system 18, and the imaging optical system 18 forms the first image IM1 corresponding to the image IM. The imaging optical system 18 is an optical system that includes all optical elements necessary for forming the first image IM1 at the predetermined position. The imaging optical system 18 does not necessarily include the intermediate element 14. The light that travels via the input element 13 is incident on the output element 15 regardless of whether the intermediate element 14 is included.

The imaging optical system 18 is substantially telecentric at the first image IM1 side. Herein, "the imaging optical system 18 is substantially telecentric at the first image IM1 side" means that the multiple chief rays L that are emitted from mutually-different positions of the display device 11, travel via the imaging optical system 18, and form the first image IM1 are substantially parallel before and after the first image IM1. "Different positions" refers to, for example, different pixels 11p. "The multiple chief rays L being substantially parallel" means being substantially parallel in a practical range that allows error such as the manufacturing precision, assembly accuracy, etc., of the components of the light source unit 10. When "the multiple chief rays L are substantially parallel," for example, the angle between the chief rays L is not more than 10 degrees.

When the imaging optical system 18 is substantially telecentric at the first image IM1 side, the multiple chief rays L cross each other before being incident on the input element 13. Hereinbelow, the point at which the plurality of chief rays L intersect each other is called a "focal point F." Therefore, for example, whether or not the imaging optical system 18 is substantially telecentric at the first image IM1 side can be confirmed by utilizing the reversibility of light in the following technique. First, a light source that can emit parallel light such as a laser light source or the like is disposed at the vicinity of the position at which the first image IM1 is to be formed. The light that is emitted from the light source is irradiated on the output element 15 of the imaging optical system 18. The light that is emitted from the light source and travels via the output element 15 is incident on the input element 13 via the intermediate element 14. Then, if the light that is emitted from the input element 13 condenses at a point, i.e., the focal point F, before reaching the liquid crystal element 12, then the imaging optical system 18 can be determined as substantially telecentric at the first image IM1 side.

With the imaging optical system 18 being substantially telecentric at the first image IM1 side, a portion of light from each pixel 11p, the portion being to pass through the focal point F and the vicinity of the focal point F, is mainly incident on the imaging optical system 18.

The configuration and position of the coupling optical system are not limited to those described above as long as the coupling optical system is substantially telecentric at the first image side. For example, the number of optical elements forming the direction modifying part may be two or more.

Reflective Polarizing Member

Figure 5:
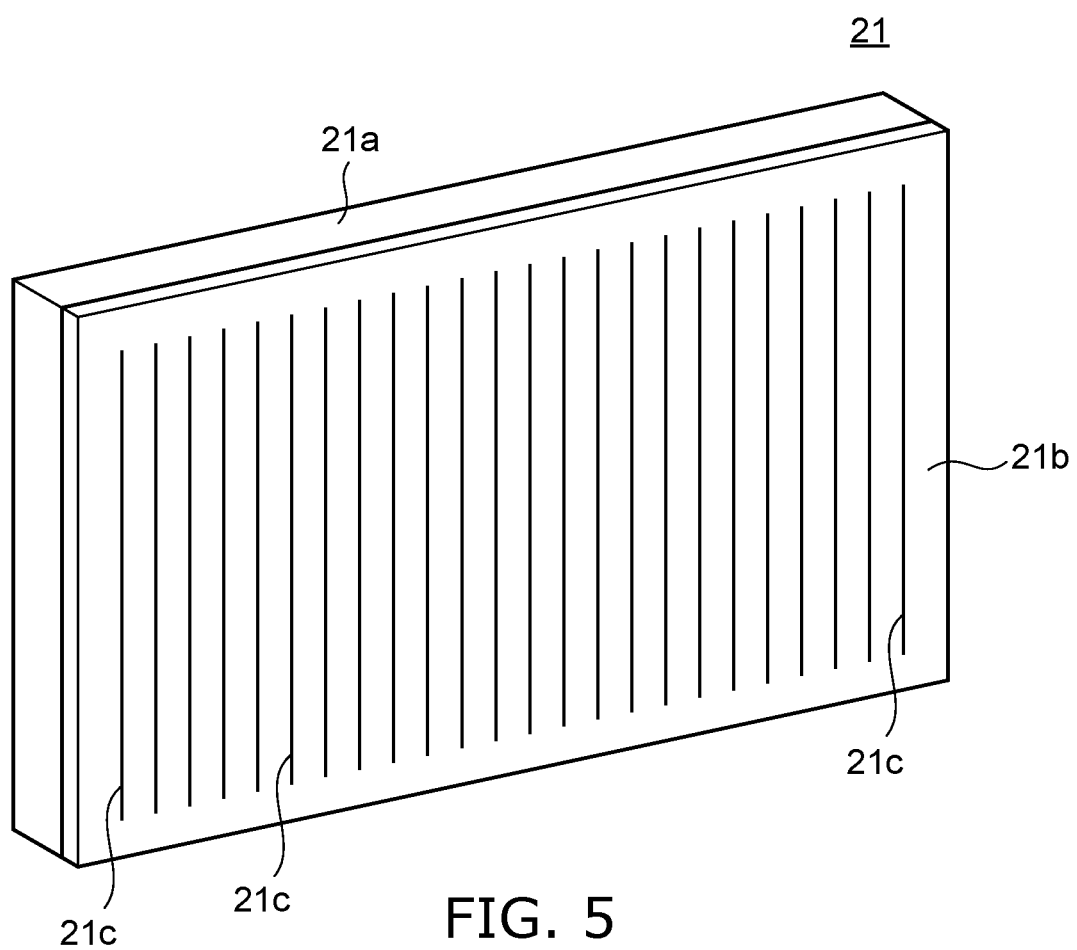
FIG. 5 is a perspective view showing the reflective polarizing member of the image display device according to the first embodiment.

FIG. 5 is a perspective view showing the reflective polarizing member of the image display device according to the present embodiment.

The reflective polarizing member 21 is located at a position on which the light emitted from the light source unit 10 is incident. As shown in FIG. 5, the reflective polarizing member 21 is, for example, a wire grid polarizing plate. The reflective polarizing member 21 includes a transparent plate 21a, a transparent resin film 21b, and multiple metal wires 21c. In the reflective polarizing member 21, the transparent resin film 21b is disposed on a surface of the transparent plate 21a, and the multiple metal wires 21c are arranged on the resin film 21b to be parallel to each other at uniform intervals.

The surface of the transparent plate 21a on which the resin film 21b is disposed is a concave surface. Accordingly, the reflective polarizing member 21 transmits one of the P-polarized light or the S-polarized light of the light emitted from the LED elements and reflects the other of the P-polarized light or the S-polarized light. In the present embodiment, the reflective polarizing member 21 transmits the P-polarized light and reflects the S-polarized light. As shown in FIG. 1, the reflected S-polarized light enters the eyebox 201 of the viewer 200.

Reflecting Member

As shown in FIG. 1, the reflecting member 22 is located at a position on which the polarized light (e.g., the P-polarized light) transmitted by the reflective polarizing member 21 is incident. The reflecting member 22 includes a concave reflecting surface 22a, and the reflecting surface 22a reflects, toward the reflective polarizing member 21, the light that is emitted from the reflective polarizing member 21 and incident on the reflecting surface 22a. The light that is reflected by the reflecting member 22 is transmitted by the reflective polarizing member 21 and enters the eyebox 201. The travel direction of the light (e.g., the P-polarized light) reflected by the reflecting member 22 is substantially the same direction as the travel direction of the light (e.g., the S-polarized light) reflected by the reflective polarizing member 21.

The reflecting member 22 may include a main member made of glass, a resin material, or the like and a reflective film that forms the reflecting surface 22a located at the surface of the main member and is made of a metal film, a dielectric multilayer film, or the like. The reflecting member 22 may be entirely made of a metal material. In an example, the reflecting surface 22a is a biconic surface. The mirror surface may be a portion of a spherical surface or may be a freeform surface.

Effects

According to the image display device 1 of the present embodiment as shown in FIG. 2, the viewer 200 can recognize the two types of virtual images IM2S and IM2P at mutually-different distances. Accordingly, the image display device 1 can display virtual images having mutually-different focal lengths. By alternately displaying the image IMS and the image IMP at a sufficiently high frequency, the viewer 200 can simultaneously view the virtual image IM2S and the virtual image IM2P, and can view a three-dimensional virtual image.

Further, according to the present embodiment, a small high-quality image can be displayed because the imaging optical system 18 is substantially telecentric at the first image IM1 side. The effects will now be described in detail.

Figure 6A:
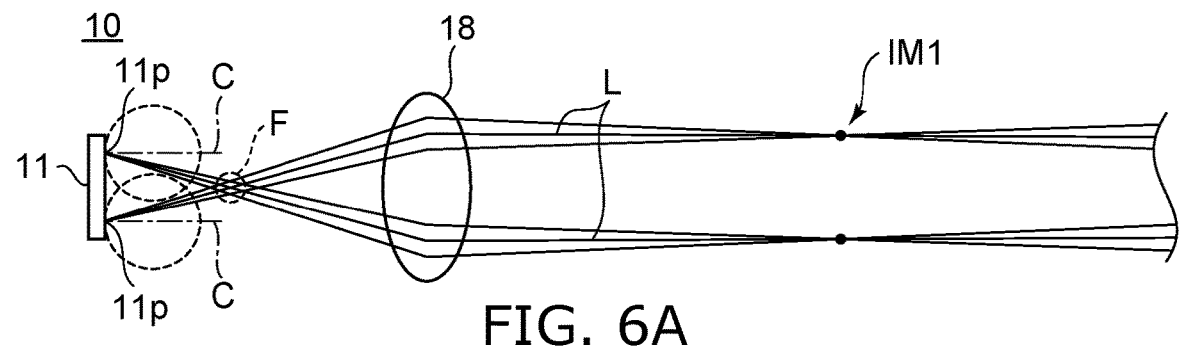
FIG. 6A is a schematic view showing the principle of a light source unit according to the first embodiment.

FIG. 6A is a schematic view showing the principle of a light source unit according to the present embodiment.

Figure 6B:
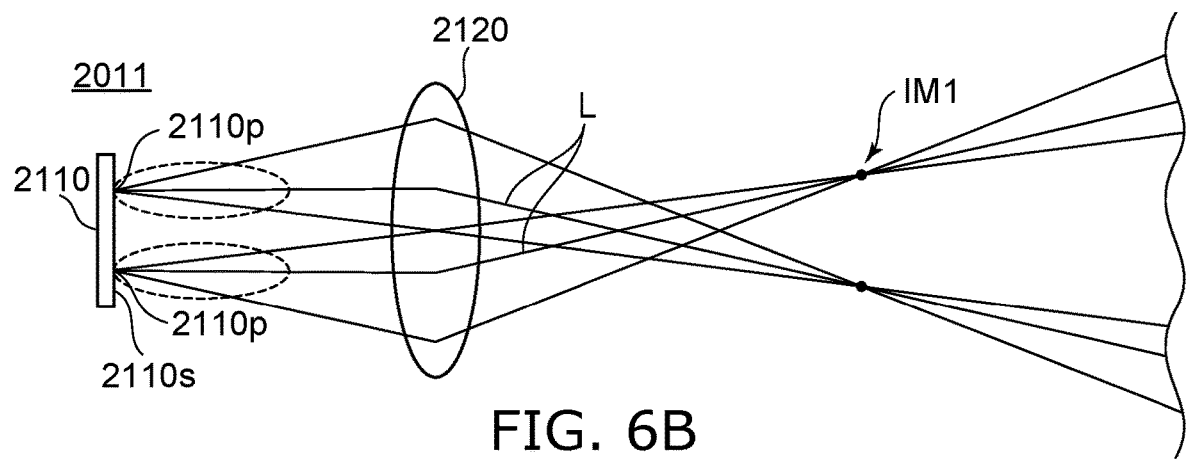
FIG. 6B is a schematic view showing the principle of a light source unit according to an example 20.

FIG. 6B is a schematic view showing the principle of a light source unit according to an example 20.

Optical characteristics of the example 20 are described below.

In the light source unit 2011 according to the example 20 as shown in FIG. 6B, a display device 2110 is an LCD (Liquid Crystal Display) that includes multiple pixels 2110p. In FIG. 6A, the light distribution pattern of the light emitted from two pixels 11p among the multiple pixels 11p of the display device 11 according to the present embodiment are illustrated by broken lines. Similarly, in FIG. 6B, the light distribution pattern of the light emitted from two pixels 2110p among the multiple pixels 2110p of the display device 2110 of the example 20 are illustrated by broken lines. The imaging optical systems 18 and 2120 are shown in simplified form in FIGS. 6A and 6B.

In the display device 2110 of the example 20 as shown in FIG. 6B, the light that is emitted from each pixel 2110p is mainly distributed in a direction normal to a light-emitting surface 2110s. Although there are many planes in which the optical axis of the light emitted from a single pixel 2110p extends, in the display device 2110 which is an LCD, the light distribution patterns of the light emitted from a single pixel 2110p are different from each other between the planes. In one plane of the plurality of planes, the light that is emitted from the pixels 2110p has a light distribution pattern in which the luminous intensity in the direction of the angle $\theta$ with respect to the optical axis is approximated by $\cos^{20} \theta$ times the luminous intensity at the optical axis.

In such a display device 2110, the luminous intensity and/or chromaticity of the light varies according to the viewing angle of the viewer, even when the light is emitted from the same position of the display device 2110. Accordingly, even when the luminance of the light emitted from all of the pixels is uniform, the luminance and/or chromaticity of the first image IM1 varies if light emitted from the display device 2110 and traveling in directions other than the normal direction is incident on the imaging optical system 2120. In other words, the quality of the first image IM1 degrades. Accordingly, to prevent degradation of the quality of the first image IM1, it is necessary to receive the light emitted from each pixel 2110p of the display device 2110 and traveling in the normal direction. This may result in an increase in the size of the imaging optical system 2120.

In contrast, in the light source unit 10 according to the present embodiment, the imaging optical system 18 is substantially telecentric at the first image IM1 side, and the light emitted from the display device 11 has a substantially Lambertian light distribution. Therefore, the quality of the first image IM1 can be improved while reducing in size of the light source unit 10.

Specifically, light emitted from the display device 11 has a substantially Lambertian light distribution, so that the dependence on the angle of the luminous intensity and/or chromaticity of the light emitted from each pixel 11p of the display device 11 is less than the dependence on the angle of the luminous intensity and/or chromaticity of the light emitted from each pixel 2110p of the display device 2110 of the example 20. In particular, as light distribution is closer to an exact Lambertian light distribution, that is, as n in $\cos^n \theta$, which is the approximation formula indicating the light distribution pattern, is closer to 1, the luminous intensity and/or chromaticity of the light emitted from each pixel 11p of the display device 11 is substantially uniform regardless of the angle. Therefore, as shown in FIG. 6A, even when the imaging optical system 18 receives light passing through the focal point F, that is, light from a direction other than the normal direction, the variation of the luminance and/or chromaticity of the first image IM1 can be reduced, and the quality of the first image IM1 can be improved.

Further, the imaging optical system 18 forms the first image IM1 mainly with light passing through the focal point F, so that an increase of the light diameter of the light incident on the imaging optical system 18 can be suppressed. This allows for reducing the size of the input element 13. Furthermore, the multiple chief rays L that are emitted from the output element 15 are substantially parallel to each other. The multiple chief rays L emitted from the output element 15 being substantially parallel to each other indicates that the region in which the light of the output element 15 contributing to the image is irradiated is substantially equal to the size of the first image IM1. Therefore, the output element 15 of the imaging optical system 18 also can be reduced in size. Thus, the light source unit 10 can be provided in which a small and high-quality first image IM1 can be formed.

The first image IM1 is formed between the light source unit 10 and the reflection unit 20. In such a case, the light that is emitted from one point of the display device 11 is condensed at the formation position of the first image IM1 after traveling via the output element 15. On the other hand, when the first image IM1 is not formed between the light source unit 10 and the reflection unit 20, the light diameter of the light emitted from one point of the display device 11 gradually spreads from the input element 13 toward the reflection unit 20. Accordingly, in the output element 15 according to the present embodiment, the region in which the light emitted from one point of the display device 11 is irradiated can be smaller than that when the first image IM1 is not formed. Therefore, the output element 15 can be reduced in size.

Further, the light source unit 10 according to the present embodiment is small, the light source unit 10 can be easily disposed in the limited space inside the vehicle 101.

In the present embodiment, unlike a typical head-up display (HUD) in which the virtual image is visible behind the front windshield 104, the virtual image IM2P and the virtual image IM2S are visible behind the reflective polarizing member 21 positioned lower than the front windshield 104. In other words, in the automobile 100, with the reflective polarizing member 21 is located below the front windshield 104, the viewer 200 can recognize a second image IM2 at a lower position than the front windshield 104. This allows for reducing the likelihood of degradation of the visibility of the virtual images IM2P and IM2S due to bright scenery outside the vehicle, and the information displayed by the virtual images IM2P and IM2S is transmitted to the viewer 200 more easily.

For example, a transparent protective screen or the like may be mounted frontward of the reflective polarizing member 21.

In the present embodiment, the imaging optical system 18 includes the bending part 16 and the direction modifying part 17. Thus, the part of the imaging optical system 18 having the function of rendering the chief rays L parallel to each other and the part of the imaging optical system 18 forming the first image IM1 at the desired position are separated from each other, which can facilitate designing of the imaging optical system 18.

A portion of the optical path inside the imaging optical system 18 extends in a direction intersecting the XY plane orthogonal to the Z-direction. Therefore, the size of the imaging optical system 18 can be somewhat reduced in directions along the XY plane.

Also, another portion of the optical path inside the imaging optical system 18 extends in a direction along the XY plane orthogonal to the Z-direction. Therefore, the size of the imaging optical system 18 can be somewhat reduced in the Z-direction.

EXAMPLES

Light source units according to examples will now be described.

Figure 7:
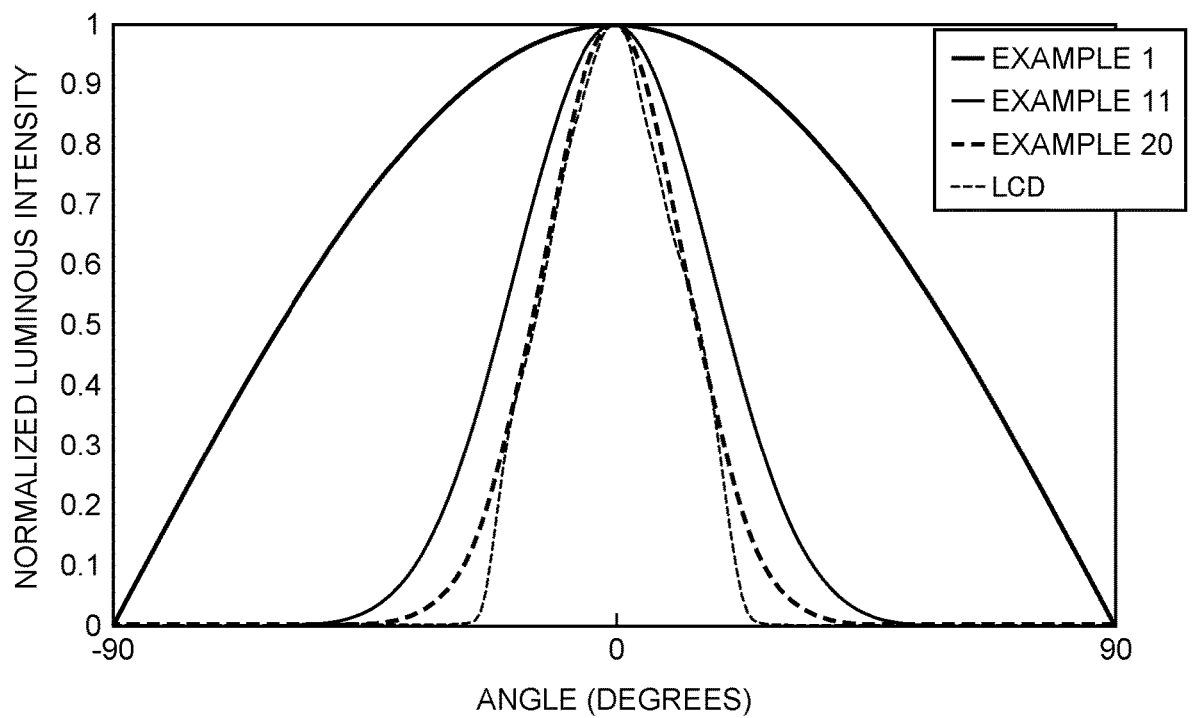
FIG. 7 is a graph showing a light distribution pattern of light emitted from one light-emitting area for examples 1, 11, and 20.

FIG. 7 is a graph showing a light distribution pattern of light emitted from one light-emitting area for examples 1, 11, and 20.

Figure 8:
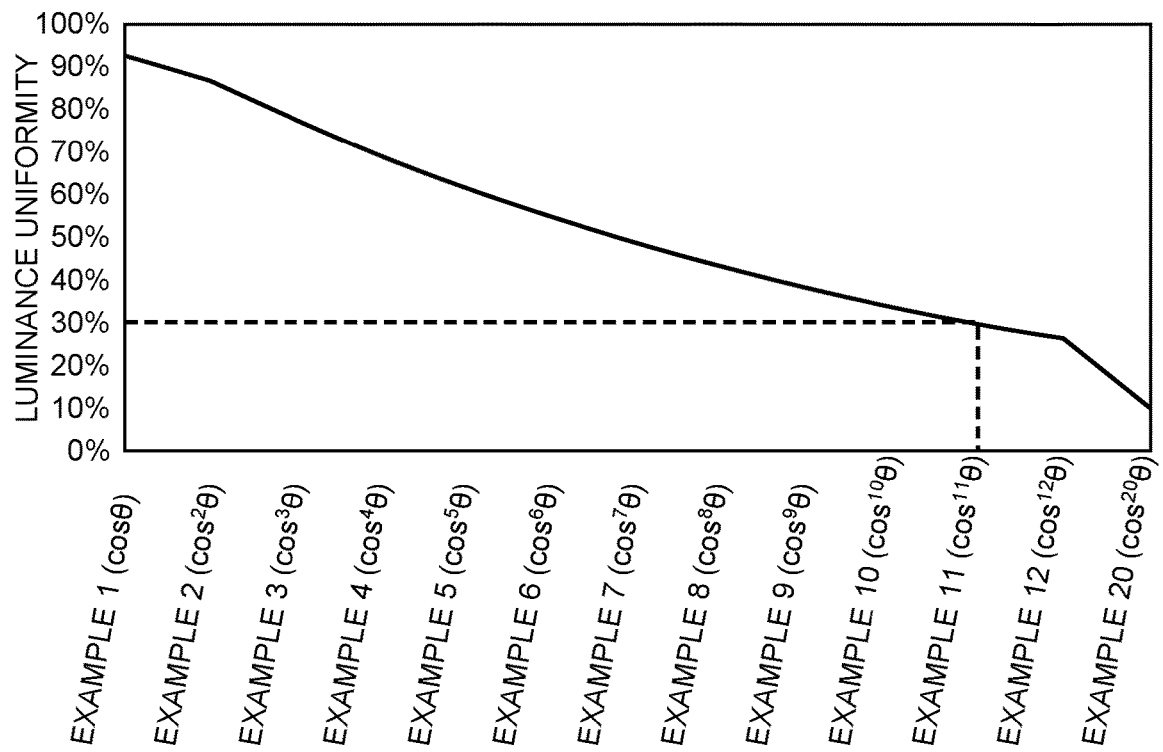
FIG. 8 is a graph showing the uniformity of the luminance of a second image for the examples 1 to 12 and the example 20.

FIG. 8 is a graph showing the uniformity of the luminance of a second image for the examples 1 to 12 and the example 20.

The image display devices according to the examples 1 to 12 and the example 20 were set in the simulation software to include a light source unit and a reflection unit, in which the light source unit included an imaging optical system and multiple light-emitting areas arranged in a matrix configuration. The light-emitting areas correspond to the pixels 11p of the display device 11 according to the first embodiment.

In FIG. 7, the horizontal axis is the angle with respect to the optical axis of the light-emitting area, and the vertical axis is the luminous intensity at the angle, normalized by dividing by the luminous intensity at the optical axis. As shown in FIG. 7, the display device according to the example 1 was set in the simulation software so that the light emitted from each light-emitting area had a light distribution pattern in which the luminous intensity in the direction of the angle $\theta$ with respect to the optical axis was represented by $\cos \theta$ times the luminous intensity at the optical axis. In other words, in the example 1, the light that was emitted from each light-emitting area had an exact Lambertian light distribution.

In the examples 2 to 12, the light from each light-emitting area was set in the simulation software to have a light distribution pattern in which the luminous intensity in the direction of the angle $\theta$ with respect to the optical axis was represented by $\cos^n \theta$ times the luminous intensity at the optical axis. In the example 2, n=2, and n was set to increase by one in order from the examples 2 to 12.

As a result of examining the light distribution pattern in one plane of the light emitted from the pixels of an LCD, the light distribution pattern was found to be similar to the light distribution pattern illustrated by the fine broken line in FIG. 7. As described above, it was found that the luminous intensity in the direction of the angle $\theta$ with respect to the optical axis in the light distribution pattern can be approximated by a light distribution pattern represented by $\cos^{20} \theta$ times the luminous intensity at the optical axis. Therefore, according to the example 20, the luminous intensity in the direction of the angle $\theta$ with respect to the optical axis of each light-emitting area was set in the simulation software to have the light distribution pattern represented by $\cos^{20} \theta$ times the luminous intensity at the optical axis.

The imaging optical systems of the examples 1 to 12 and the example 20 each were set to be telecentric at the first image side.

Then, the luminance distribution of the second image formed when the luminance was constant for all of the light-emitting areas was simulated for the examples 1 to 12 and the example 20. The "second image" collectively refers to the "virtual image IM2S" and the "virtual image IM2P" described above. In this case, the second image was a rectangle having a long side of 111.2 mm and a short side of 27.8 mm. Also, in this case, the plane in which the second image was formed was divided into square areas having sides of 1 mm, and the luminance value of each area was simulated. Then, the uniformity of the luminance of the second image was evaluated. As used herein, the term "uniformity of the luminance" refers to a value of the ratio of the minimum value to the maximum value of the luminance inside the second image expressed in percent. The results are shown in FIG. 8. In FIG. 8, the horizontal axis is the examples, and the vertical axis is the uniformity of the luminance.

As shown in FIG. 8, it was found that the uniformity of the luminance degraded as n increased. This is because the luminance at positions separated from the center of the second image decreased as n increased. In particular, it was found that the uniformity of the luminance was 30% for the example 11, that is, when n=11. It is thought that it is sufficient for the uniformity of the luminance of the second image to be not less than 30% so that the user can easily discriminate between the second image and the regions at which the second image is not formed.

Accordingly, it was found that, when the imaging optical system is configured to be substantially telecentric, it is favorable for the light emitted from the display device to have a substantially Lambertian light distribution to reduce unevenness in the luminance of the first and second images. Specifically, it was found that it is favorable for n of $\cos^n \theta$, which is the approximation formula of the light distribution pattern, to be not more than 11, and more favorably 1. Although the uniformity of the luminance of the second image degrades as n deviates from 1 as described above, a predetermined luminance distribution can be preset in the display luminance of the display device 11 to remedy such nonuniformity of the luminance. For example, when the luminance at the outer edge portion of the second image tends to be less than the luminance at the central portion thereof due to the light emitted from the pixels 11p of the display device 11 traveling via the imaging optical system 18, the display device 11 may be controlled such that the outputs of the LED elements 112 of the pixels 11p at the outer peripheral side of the display device 11 to be greater than the outputs of the LED elements 112 of the pixels 11p at the central portion of the display device 11.

The display device 2110 according to the example 20 is larger because the light emitted from each pixel 2110p of the display device 2110 does not have a substantially Lambertian light distribution. Meanwhile, similarly to the first embodiment, the display device 2110 can display two types of virtual images having mutually-different focal lengths.

Second Embodiment

Figure 9:
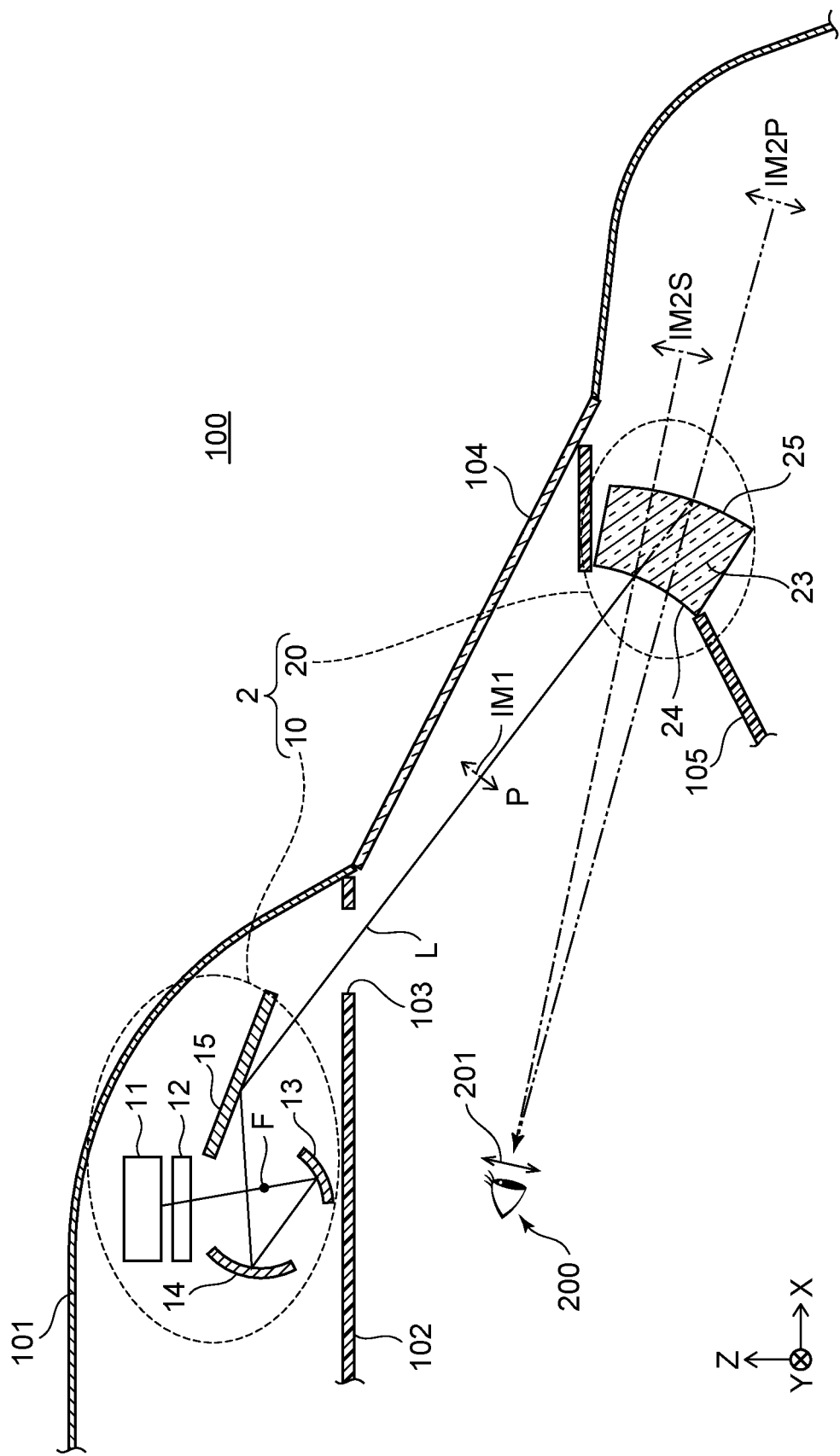
FIG. 9 is an end view showing an image display device according to a second embodiment.

FIG. 9 is an end view showing an image display device according to the present embodiment.

As shown in FIG. 9, the image display device 2 according to the present embodiment differs from the image display device 1 according to the first embodiment in that a light-transmitting member 23 is provided instead of the reflective polarizing member 21 and the reflecting member 22. The light-transmitting member 23 is located at a position on which the light emitted from the liquid crystal element 12 is incident.

The light-transmitting member 23 is a block formed of a light-transmitting material, e.g., a resin or glass, and includes a first surface 24 and a second surface 25. The first surface 24 functions similarly to the reflective polarizing member 21 according to the first embodiment, and the second surface 25 functions similarly to the reflecting member 22 according to the first embodiment.

The first surface 24 reflects one light of the P-polarized light or the S-polarized light emitted from the liquid crystal element 12 and allows the other light of the P-polarized light or the S-polarized light to enter the light-transmitting member 23. In the present embodiment, for example, the first surface 24 reflects the S-polarized light and allows the P-polarized light to enter. However, the P-polarized light may be reflected, and the S-polarized light may be allowed to enter. For example, the first surface 24 may include a wire grid film. The wire grid film includes, for example, the transparent resin film 21b and the multiple metal wires 21c shown in FIG. 5.

The second surface 25 reflects, toward the first surface 24, the other light (e.g., the S-polarized light) entering the light-transmitting member 23 via the first surface 24. The travel direction of the light (e.g., the S-polarized light) reflected by the second surface 25 is the same as the travel direction of the one light (e.g., the P-polarized light) reflected by the first surface 24. The second surface 25 can be formed of, for example, a reflective film such as a metal film, a dielectric multilayer film, etc. In an example, the second surface 25 is a biconic surface. However, the second surface 25 may be a portion of a spherical surface or may be a freeform surface.

According to the present embodiment, the first and second surfaces 24 and 25 of the single light-transmitting member 23 can exhibit functions similar to those of the reflective polarizing member 21 and the reflecting member 22 in the first embodiment. Accordingly, the positional relationship between the first surface 24 and the second surface 25 is stable, and a lower cost of the reflection unit 20 can be realized. With the light-transmitting member 23 located below the front windshield 104, the viewer 200 can recognize the second image IM2 at a lower position than the front windshield 104 similarly to the first embodiment. Other configuration, operations, and effects in the present embodiment are similar to those of the first embodiment.

Third Embodiment

Figure 10:
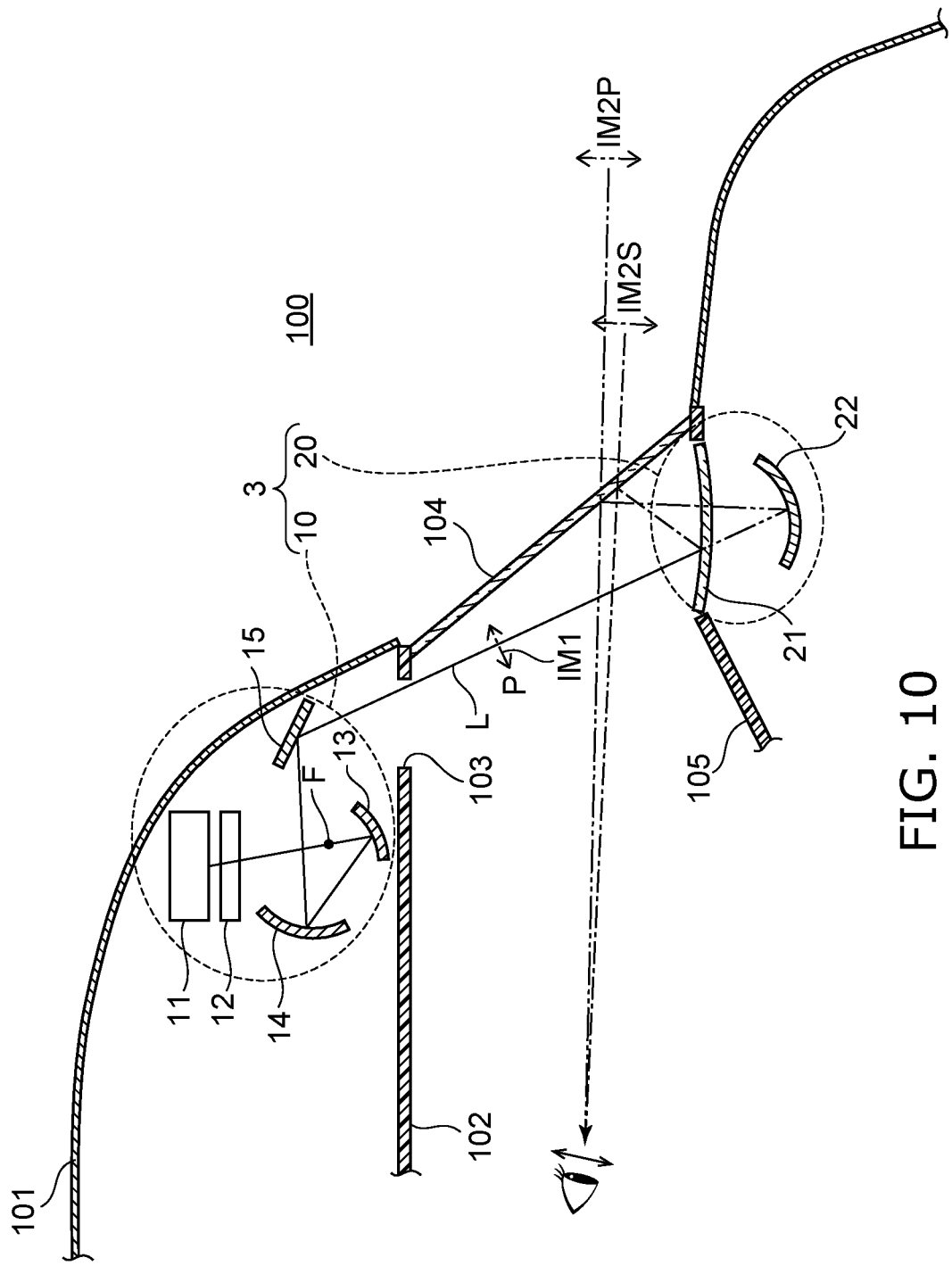
FIG. 10 is an end view showing an image display device according to a third embodiment.

FIG. 10 is an end view showing an image display device according to the present embodiment.

Figure 11:
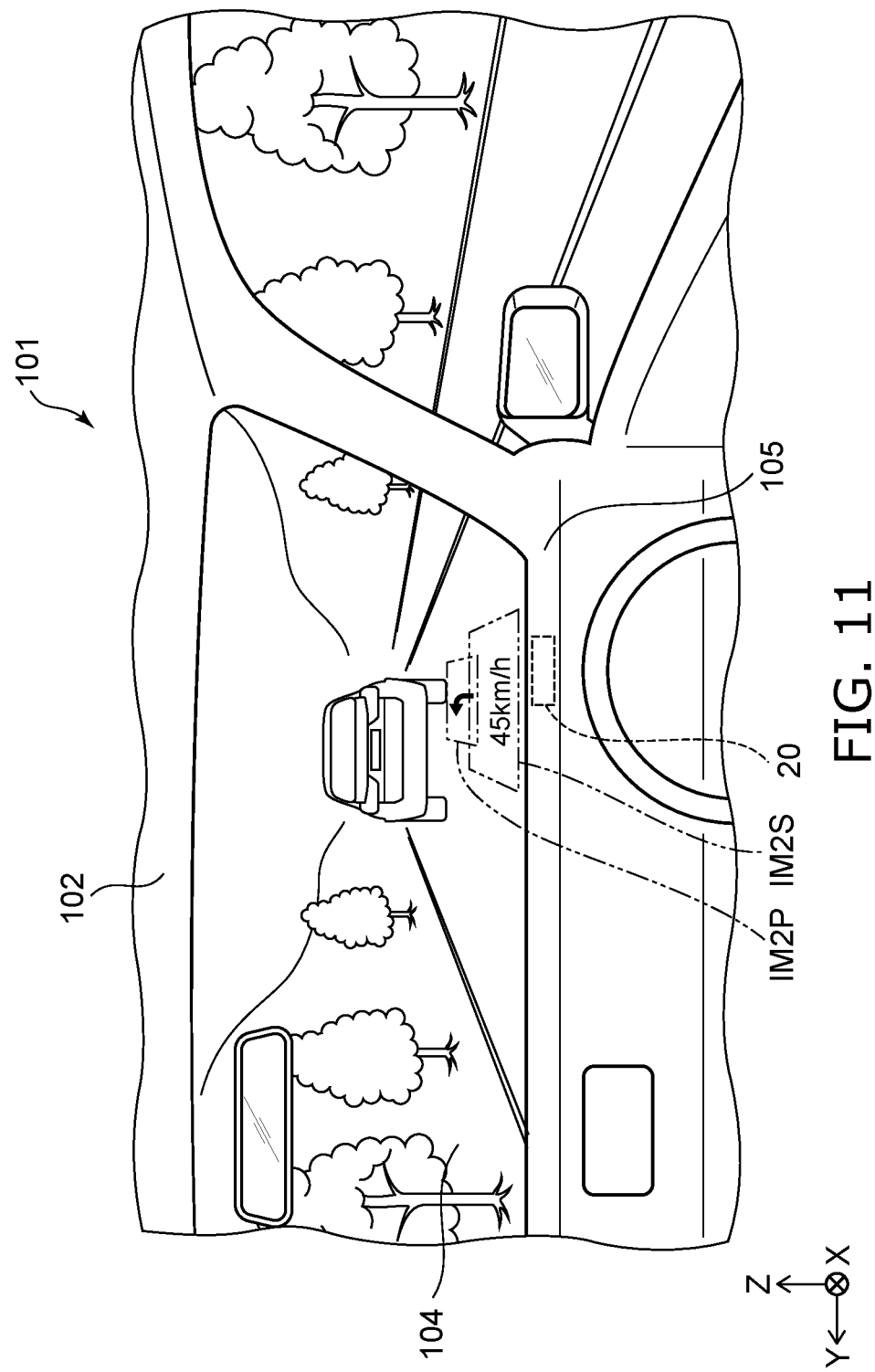
FIG. 11 is a schematic view showing scenery when viewed from a viewer in a driver's seat.

FIG. 11 is a schematic view showing scenery when viewed from a viewer in a driver's seat.

In the image display device 3 according to the present embodiment as shown in FIG. 10, the light that is emitted from the reflection unit 20 is reflected at the inner surface of the front windshield 104 of the vehicle 101 and reaches the eyebox 201 of the viewer 200.

Accordingly, as shown in FIG. 11, the viewer 200 can recognize the virtual images IM2P and IM2S through the front windshield 104. The virtual image IM2P appears to be more distant than the virtual image IM2S. In the example shown in FIG. 11, the virtual image IM2S represents information, e.g., the speed, of the vehicle 101; the virtual image IM2P represents navigation information, e.g., the direction of a corner ahead. However, the content of the virtual images IM2P and IM2S is not limited thereto.

According to the present embodiment, the viewer 200 can recognize the virtual image IM2P and the virtual image IM2S through the front windshield 104. Accordingly, the viewer 200 can recognize the content displayed in the virtual images IM2P and IM2S without shifting eyes of the viewer 200 from the front of the automobile 100. Thus, for example, the image display device 3 according to the present embodiment is included in a HUD of the automobile 100.

According to the present embodiment, the positional relationship of the virtual images IM2P and IM2S can be controlled by adjusting the positions of the light source unit 10 and the reflection unit 20 with respect to the front windshield 104. For example, in the example shown in FIG. 11, the virtual image IM2P that appears to be more distant can be displayed at a location higher than the virtual image IM2S (in the +Z direction). Other configuration, operations, and effects according to the present embodiment are similar to those of the first embodiment.

Fourth Embodiment

A fourth embodiment will now be described.

Figure 12:
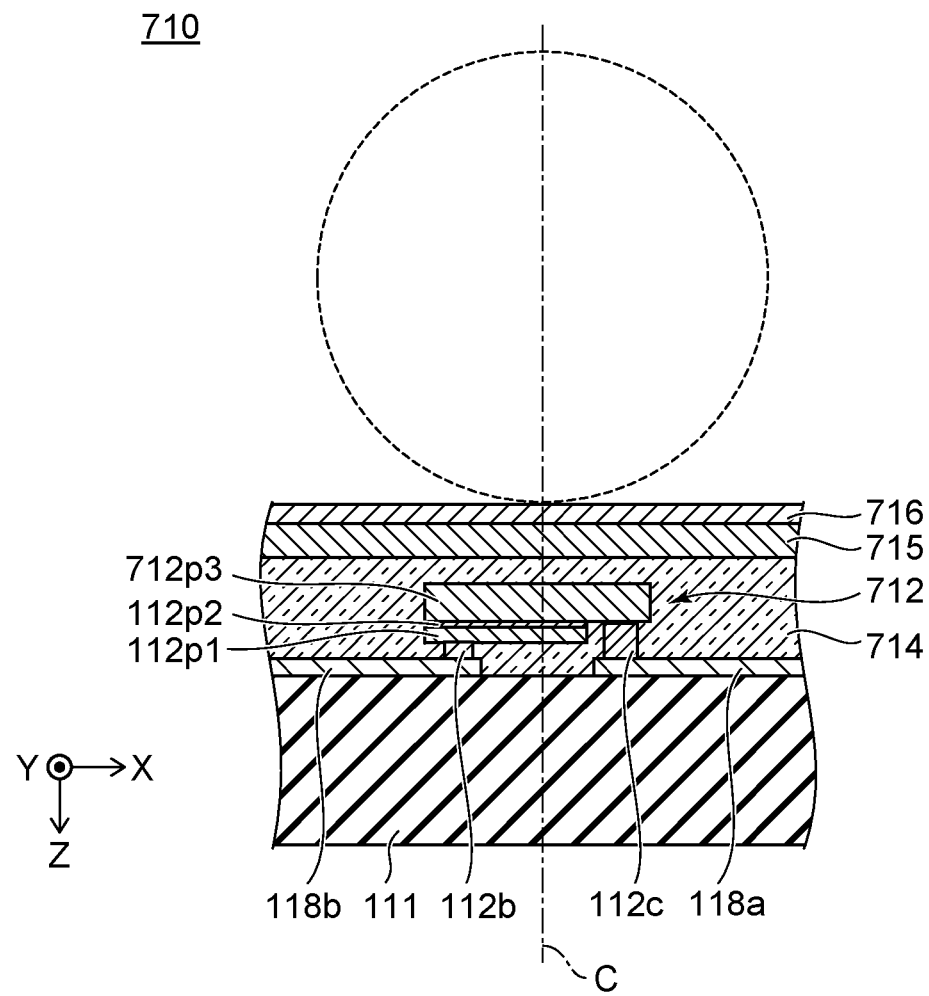
FIG. 12 is a cross-sectional view showing a display device of an image display device according to a fourth embodiment.

FIG. 12 is a cross-sectional view showing a display device of an image display device according to the present embodiment.

The display device 710 according to the present embodiment differs from the display device 11 according to the first embodiment in that the surface of an n-type semiconductor layer 712p3 positioned at the side opposite to the surface facing the active layer 112p2 is substantially flat; a protective layer 714, a wavelength conversion member 715, and a color filter 716 are further included.

The protective layer 714 covers multiple LED elements 712 arranged in a matrix configuration. The protective layer 714 can include, for example, a light-transmitting material such as a polymer material that includes a sulfur (S)-including substituent group or a phosphorus (P) atom-including group, a high refractive index nanocomposite material in which inorganic nanoparticles having a high refractive index are added to a polymer matrix of polyimide, etc.

The wavelength conversion member 715 is disposed on the protective layer 714. The wavelength conversion member 715 contains one or more types of wavelength conversion materials such as a general fluorescer material, a perovskite fluorescer material, a quantum dot (QD), etc. The light that is emitted from each LED element 712 is incident on the wavelength conversion member 715. When light emitted from the LED element 712 is incident on the wavelength conversion material, the wavelength conversion material that is contained in the wavelength conversion member 715 emits light of a peak emission wavelength different from a peak emission wavelength of the LED element 712. The light that is emitted by the wavelength conversion member 715 has a substantially Lambertian light distribution.

The color filter 716 is located on the wavelength conversion member 715. The color filter 716 is configured to shield the greater part of the light emitted from the LED element 712. Accordingly, the light that is emitted mainly from the wavelength conversion member 715 exits each pixel 11p. Therefore, as shown by the broken line in FIG. 12, the light that is emitted from each pixel 11p exhibits a substantially Lambertian light distribution. When the greater part of the light emitted from the LED element is absorbed by the wavelength conversion member, the display device does not necessarily include a color filter. Thus, the light that is emitted from each pixel can exhibit a Lambertian light distribution even when multiple recesses or protrusion are not provided in the light-emitting surface of the LED element.

In the present embodiment, the peak emission wavelength of the LED element 712 may be in the ultraviolet region or may be in the visible light region. When blue light is to be emitted from at least one pixel 11p, for example, blue light may be emitted from the LED element 712 of such a pixel 11p; the wavelength conversion member 715 and the color filter 716 are not necessarily provided for this pixel 11p. In such a case, the light that is emitted from the pixel 11p may have a substantially Lambertian light distribution by providing a light-scattering member including light-scattering particles to cover the LED element 712. Other configuration, operations, and effects according to the present embodiment are similar to those of the first embodiment.

Fifth Embodiment

A fifth embodiment will now be described.

Figure 13:
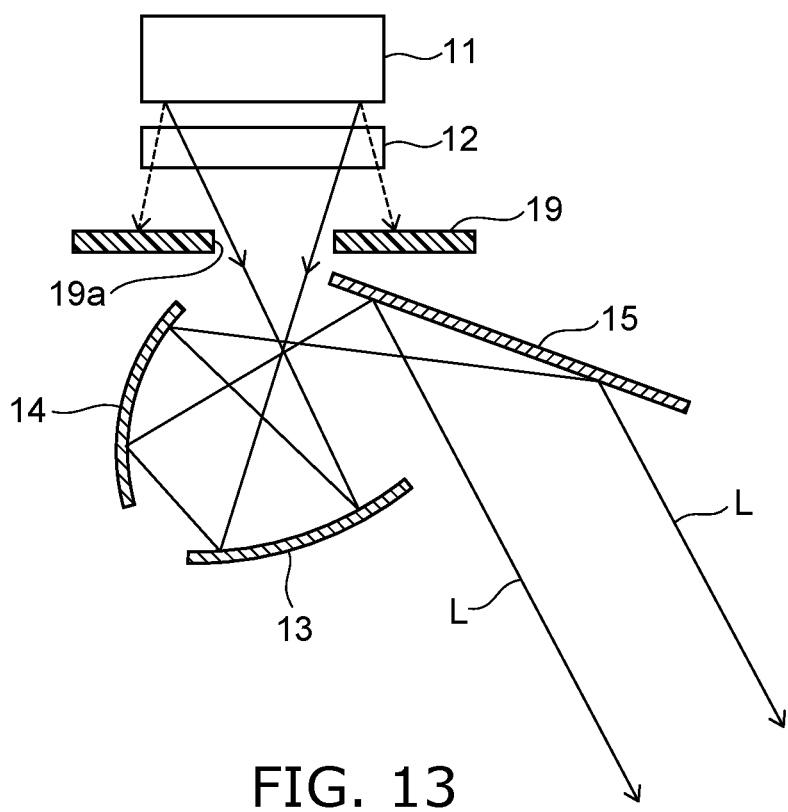
FIG. 13 is an end view showing a light source unit of an image display device according to a fifth embodiment.

FIG. 13 is an end view showing a light source unit of an image display device according to the present embodiment.

As shown in FIG. 13, the light source unit 30 of the image display device according to the present embodiment differs in that a light-shielding member 19 is provided in addition to the configuration of the light source unit 10 according to the first embodiment.

The light-shielding member 19 is disposed in the optical path from the liquid crystal element 12 toward the input element 13. An aperture 19a that transmits a portion of the light from the liquid crystal element 12 toward the input element 13 is provided in the light-shielding member 19. The light-shielding member 19 shields another portion of the light from the liquid crystal element 12 toward the input element 13.

According to the present embodiment, with the light-shielding member 19, generation of stray light can be reduced, so that the quality of the virtual images can be further improved. Other configuration, operations, and effects in the present embodiment are similar to those of the first embodiment.

Although examples in which the viewer 200 simultaneously recognizes the virtual image IM2P and the virtual image IM2S are shown in the embodiments described above, the operation is not limited thereto. The image display device may be configured to allow the viewer 200 to steadily view only one of the virtual image IM2P or the virtual image IM2S. For example, when the viewer 200 wears polarized sunglasses, there are cases where the S-polarized light or the P-polarized light is shielded by the polarized sunglasses. In such a case, the image display device may be configured to activate only the display caused by the unshielded polarized light and not to perform the display caused by the polarized light shielded by the polarized sunglasses.

Although examples in which light reflected by the reflecting member 22 or the second surface 25 of the light-transmitting member 23 passes through the reflective polarizing member 21 or the first surface 24 of the light-transmitting member 23 are shown in the embodiments described above, the configuration is not limited thereto. Depending on the positional relationship of the light source unit 10, the reflective polarizing member 21, and the reflecting member 22, the light that is reflected by the reflecting member 22 may directly or indirectly enter the eyebox 201 without passing through the reflective polarizing member 21.

Exemplary embodiments of the invention are described above with reference to specific examples. However, the embodiments of the invention are not limited to these specific examples. For example, additions, deletions, or modifications of some of the components or processes in the embodiments described above also are included in the invention. The embodiments described above can be implemented in combination with each other.

For example, the invention can be utilized in a head-up display, etc.

What is claimed is:

1. An image display device comprising:
a display device configured to display an image;
a liquid crystal element on which light emitted from the display device is incident, the liquid crystal element being configured to selectively allow one of P-polarized light or S-polarized light to exit the liquid crystal element;
a reflective polarizing member configured to reflect the one of the P-polarized light or the S-polarized light that has exited the liquid crystal element and to transmit the other of the P-polarized light or the S-polarized light; and
a reflecting member configured to reflect the other of the P-polarized light or the S-polarized light in the same direction as a travel direction of the one of the P-polarized light or the S-polarized light reflected by the reflective polarizing member, wherein:
the reflective polarizing member is configured to transmit the other of the P-polarized light or the S-polarized light reflected by the reflecting member.

2. The image display device according to claim 1, further comprising:
an imaging optical system on which the light emitted from the liquid crystal element is incident, the imaging optical system configured to form a first image corresponding to the image displayed by the display device, wherein:
the imaging optical system is substantially telecentric at a first image side, and
the light emitted from the display device exhibits a substantially Lambertian light distribution.

3. The image display device according to claim 2, wherein:
the light emitted from the display device exhibits a light distribution pattern in which a luminous intensity of the light emitted from the display device in a direction of an angle $\theta$ with respect to an optical axis of the light emitted from the display device is approximated by $\cos^n \theta$ times a luminous intensity at the optical axis, and n is a value greater than 0.

4. The image display device according to claim 3, wherein:
n is not more than 11.

5. The image display device according to claim 2, wherein:
the imaging optical system comprises:
a bending part comprising an input element on which light emitted from the liquid crystal element is incident, the bending part configured to bend a plurality of chief rays, which have been emitted from mutually-different positions of the display device and have intersected each other before being incident on the input element so as to form the first image, such that the plurality of chief rays are substantially parallel to each other before and after forming the first image, and
a direction modifying part comprising an output element on which light traveling via the input element is incident, the direction modifying part configured to modify a travel direction of the plurality of chief rays traveling via the bending part to be oriented toward a formation position of the first image.

6. The image display device according to claim 2, further comprising:
a light-shielding member located between the liquid crystal element and the imaging optical system, the light-shielding member having an aperture through which a portion of light from the liquid crystal element toward the imaging optical system passes, the light-shielding member configured to shield another portion of the light from the liquid crystal element traveling toward the imaging optical system.

7. The image display device according to claim 1, wherein:
the display device is an LED display comprising a plurality of LED elements, and
light emitted from the LED element exhibits a substantially Lambertian light distribution.

8. The image display device according to claim 7, wherein:
the display device further comprises a wavelength conversion member located on the LED elements, and
the light emitted from the LED elements is incident on the wavelength conversion member.

9. An automobile comprising:
a vehicle; and
the image display device according to claim 1, which is mounted in the vehicle.

10. The automobile according to claim 9, wherein:
the image is visible at a position lower than a front windshield of the vehicle.

11. An image display device comprising:
a display device configured to display an image;
a liquid crystal element on which light emitted from the display device is incident, the liquid crystal element being configured to selectively allow one of P-polarized light or S-polarized light to exit the liquid crystal element; and
a light-transmitting member on which light emitted from the liquid crystal element is to be incident,
the light-transmitting member comprising:
a first surface configured to reflect the one of the P-polarized light or the S-polarized light that has exited the liquid crystal element and to allow the other of the P-polarized light or the S-polarized light to enter the light-transmitting member, and
a second surface configured to reflect the other of the P-polarized light or the S-polarized light into a direction same as a travel direction of the one of the P-polarized light or the S-polarized light reflected by the first surface, wherein:
the first surface is configured to transmit the other of the P-polarized light or the S-polarized light reflected by the second surface.

12. The image display device according to claim 11, further comprising:
an imaging optical system on which the light emitted from the liquid crystal element is to be incident, the imaging optical system forming a first image corresponding to the image displayed by the display device, wherein:
the imaging optical system is substantially telecentric at the first image side, and
the light emitted from the display device exhibits a substantially Lambertian light distribution.

13. The image display device according to claim 12, wherein:
the light emitted from the display device has a light distribution pattern in which a luminous intensity of the light emitted from the display device in a direction of an angle $\theta$ with respect to an optical axis of the light emitted from the display device is approximated by $\cos^n \theta$ times a luminous intensity at the optical axis, and n is a value greater than 0.

14. The image display device according to claim 13, wherein:
n is not more than 11.

15. The image display device according to claim 12, wherein:
the imaging optical system comprises:
- a bending part comprising an input element on which light emitted from the liquid crystal element is incident, the bending part configured to bend a plurality of chief rays, which have been emitted from mutually-different positions of the display device and have intersected each other before being incident on the input element so as to form the first image, such that the plurality of chief rays are substantially parallel to each other before and after forming the first image, and
- a direction modifying part comprising an output element on which light traveling via the input element is incident, the direction modifying part configured to modify a travel direction of the plurality of chief rays traveling via the bending part to be oriented toward a formation position of the first image.

16. The image display device according to claim 12, further comprising:
a light-shielding member located between the liquid crystal element and the imaging optical system, the light-shielding member having an aperture through which a portion of light from the liquid crystal element toward the imaging optical system passes, the light-shielding member configured to shield another portion of the light from the liquid crystal element traveling toward the imaging optical system.

17. The image display device according to claim 11, wherein:
the display device is an LED display including a plurality of LED elements, and
light emitted from the LED elements exhibits a substantially Lambertian light distribution.

18. The image display device according to claim 17, wherein:
the display device further comprises a wavelength conversion member located on the LED elements, and
the light emitted from the LED elements is incident on the wavelength conversion member.

19. An automobile comprising:
a vehicle; and
the image display device according to claim 11, which is mounted in the vehicle.

20. The automobile according to claim 19, wherein:
the image is visible at a position lower than a front windshield of the vehicle.

\* \* \* \* \*